United States Patent Office.

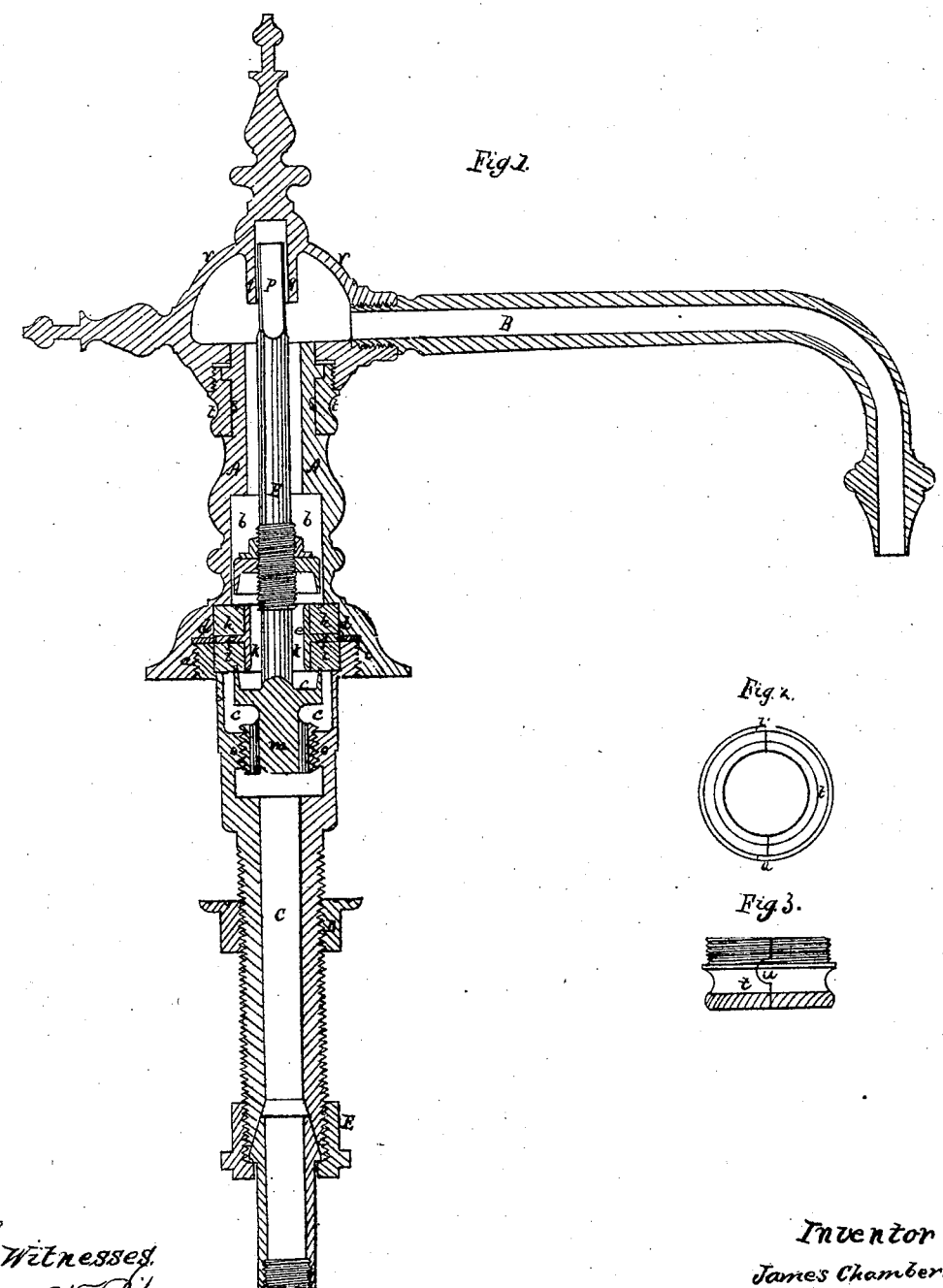

JAMES CHAMBERS, OF BOSTON, MASSACHUSETTS.

Letters Patent No. 72,453, dated December 24, 1867; antedated December 7, 1867.

IMPROVEMENT IN BASIN-FAUCETS.

The Schedule referred to in these Letters Patent and making part of the same.

TO ALL PERSONS TO WHOM THESE PRESENTS SHALL COME:

Be it known that I, JAMES CHAMBERS, of Boston, in the county of Suffolk, and State of Massachusetts, have made a new and useful invention having reference to Wash-Basin Faucets; and do hereby declare the same to be fully described in the following specification, and represented in the accompanying drawings, of which—

Figure 1 is a longitudinal section of a basin-faucet provided with my invention.

Figure 2 is a top view, and

Figure 3 a side elevation of the nut by which the globular head of its eduction-pipe is connected with the stand or standard.

This faucet is of the kind in which the nozzle or eduction-pipe is capable of being turned horizontally over and away from the basin, the act of turning it over the basin enabling it to discharge water therein, and the act of moving it back from the basin causing the flowage of the water from the nozzle to be arrested.

I have provided the faucet with a mechanism by which the closing of the faucet may be effected at either extreme of movement of the eduction-tube, whatever may be the arc or number of degrees contained in such movement.

The particular object of my invention is to enable a person to readily adjust the parts of the faucet, to admit it to operate at whatever angle of swing may be determined for its nozzle.

In the drawings, A denotes the hollow or tubular stand or standard of the faucet, B being the nozzle or eduction-tube. C is the induction-tube, made in the ordinary manner, and provided with a clamp-nut, D, and a pipe-coupling nut, E. The standard and the induction-tube are connected by screws, as shown at $a\ a$. There is a valve-chamber, $b$, in the stand A, and also another such chamber, $c$, in the upper part of the pipe C, there being a packing-chamber, $d$, of larger diameter, arranged between the two, as represented. Within the packing-chamber is a short tube, $e$, provided with an annular flange, $f$, which encompasses it at its middle. Surrounding the tube $e$, and resting on opposite sides of the flange, are two annuli or rings, $h\ i$, of vulcanized India rubber or leather. A valve-stem, E, provided with two cup or bell-valves, F G, extends through the tube $e$, concentrically, the diameter of the stem, where it goes through the tube, being somewhat less than that of the bore of the tube, in order that there may be within the tube and about the stem an annular passage, $k$. The lower valve, G, which is everted or turned upward, is fastened to the stem. The upper valve F is inverted or turned downward, and screws upon the stem, and is held in place thereon by means of a check-nut, $l$, also screwed on the stem. The lower end of the stem terminates in a cylindrical head, $m$, which is perforated with water-passages $n\ n$, and has a quick-screw cut on its circumference, such screw being screwed into a corresponding female screw formed in the induction-pipe, the same being as shown at $o\ o$. The upper portion, $p$, of the stem E is constructed prismatic, and enters a corresponding socketed projection, $q$, extending down within and from the hollow globular head, $r$, of the nozzle B, the whole being so that the stem may be revolved by and with the nozzle when the latter is turned on the standard A. The nozzle revolves freely on the upper part of the standard, and is connected therewith by means of an annular nut, $t$, arranged within an annular groove, $s$, formed in the standard. The said nut is made in halves or separate parts, as shown in figs. 2 and 3, one of which is provided, at each of its ends, with a projection, $u$, to enter a corresponding recess made in the adjacent end of the other part. This nut screws up into the head $r$ in manner as represented in fig. 1.

The two rubber annuli, $h\ i$, not only constitute seats to the two valves, but serve as a packing to prevent the escape of liquid through the screw-joint at $a\ a$.

From the above it will be seen that the upper valve F is adjustable on the stem with reference to the lower valve G, and the distance which these valves may be set apart from each other will determine the extent of rotary movement of the nozzle or eduction-tube B on the standard, for, when the said nozzle is turned, it will revolve the stem E. When the nozzle is moved in one direction, the screws at $o\ o$ will cause the stem to rise, but when the nozzle is moved in the opposite direction, the said screws will cause the stem to be depressed, the contact of either valve with its seat limiting the movement of the stem.

Now, if, when the two valves are at equal distances from their seats, we suppose the nozzle to be in the proper position over a wash-bowl to discharge water into it, we shall perceive that, by turning the nozzle in either direction horizontally, so as to bring either valve against its seat, we shall cut off the flowage of water, which, in its course through the faucet, goes through the induction-tube C, the passages $n$ $n$, the valve-chamber $c$, the tube $e$, the valve-chamber $b$, and thence through the standard and the nozzle.

I am aware that it is not new to have a faucet provided with a single valve and seat, and also with its stem furnished with a screw for moving the valve relatively to its seat; therefore, I make no claim to such in the abstract.

What I claim as my invention, in the faucet herein described, is as follows:

I claim the combination as well as the arrangement of the two valves F G, their seats $h$ $i$, the passage $k$, the valve-chambers $b$ $c$, the standard A, and the stem E, provided with operative screws $o$, as specified.

I also claim the combination as well as the arrangement of the nozzle B, the standard A, the stem E, its operative screws $o$, the valves F G, their seats $h$ $i$ and chambers $b$ $c$, and the passage $k$.

I also claim the combination of the tube $e$, the flange $f$, and the two elastic annuli $h$ $i$; also, their arrangement, with respect to the screw-joint $a$ of the parts A C, as described.

I also claim the combination of one of the valves F G with its stem, by means whereby one may be adjusted thereon, with reference to the other, for the purpose of terminating the movement of the nozzle, as described.

<div align="right">JAMES CHAMBERS.</div>

Witnesses:
    R. H. EDDY,
    F. P. HALE, Jr.